Patented Mar. 28, 1944

2,345,322

UNITED STATES PATENT OFFICE 2,345,322

PARTIALLY GELATINIZED STARCH AND PROTEIN MIXTURE

Ben F. Buchanan, Leonia, N. J., and Robert L. Lloyd, Laurelton, N. Y., assignors to American Maize-Products Company, a corporation of Maine No Drawing. Application August 14, 1942, Serial No. 454,882

6 Claims. (Cl. 99—123)

This invention relates to a suspension of a partially gelatinized mixture of starch and protein in a fat and the method of making.

Because the invention is particularly useful in the preparation of an improved pan grease, the invention will be illustrated in detail in connection with the making of such grease.

Pan greases are used in the baking industry, as, for example, in greasing the interior surface of pans to be used in baking cakes or other doughs of high moisture content. A usual technique involves the application of the pan grease by spraying. For this purpose there is made a stock suspension, say of flour or starch in the semi-liquid fat to be used, and the mixture is withdrawn from the stock as required and applied with the usual type of spray gun to the interior of the bottom and sides of the pans to receive the dough to be baked.

Certain difficulties are encountered in connection with such pan greases. Thus, the suspended flour or starch settles objectionably. If stirring is used to prevent this settling or to make the suspension fairly uniform before charging to the spray gun, there is frequent plugging of the nozzle of the spray gun by agglomerated masses of the suspended flour or starch.

The present invention provides a pan grease that is substantially free from these difficulties.

The invention comprises an admixture to replace the flour or starch in conventional suspensions in fats and particularly an admixture for fats in the making of pan greases, the admixture comprising the product of partially gelatinizing an aqueous mixture of starch and water insoluble protein in proportion that is minor as compared to the proportion of starch and converting the gelatinized material to dried and powdered condition. The invention comprises also the finished suspension such as pan grease made by incorporating the admixture in finely divided form into a fat, say in semi-liquid condition, the fat being used in amount adequate to constitute an external phase extending continuously between the particles of the suspended admixture. The invention includes in addition the method of making the admixture and the finished suspension.

In general, there is used a mixture of starch and water insoluble protein that has been subjected to an incomplete gelatinization treatment in manner conventional for starches alone. Thus, a mixture of corn starch and water insoluble corn protein is mixed with sufficient water to form a slurry that is thick but sufficiently flowable to permit pumping. A batch of this slurry is heated with steam until the temperature reaches approximately 135° to 150° F. and preferably about 140° to 150° F. The time of heating at the maximum temperature need be only momentary at the higher temperatures within the above range as the necessary incomplete gelatinization is obtained during the period required to warm the batch to such temperatures and to cool it. At lower temperatures the period of heating should be at least a few minutes to an hour or so. The gelatinization must be substantial but must be stopped before the starch in the mixture is reduced to a paste. The partially gelatinized product is filtered or centrifuged to remove as much as possible of the water. The remaining partially dried cake is dried and then pulverized.

The extent of gelatinization which is sometimes referred to herein as partial gelatinization must be controlled within certain limits. It must be incomplete but at least sufficient to make a product that has a bodying effect when stirred into cold water and allowed to stand. The starch and protein mixture should be gelatinized to the extent that it has a water absorption substantially higher than that of such a mixture that has not been subjected to any gelatinization but much below the absorption of a completely gelatinized mixture. For best results, the mixture is one having a water absorption value as measured by the standard test of about 1.5 to 2.5 and preferably 1.6 to 2. When the gelatinized starch mixture used is one of water absorption much above 2.5, then there is sticking of the baked goods to the greased pan, considered to be due to absorption of water from the batter by the starch and protein mixture during the baking period. With an absorption value much below 1.5, there is not obtained the desired minimized rate of settling from the suspension in the fat.

The partially gelatinized, finely divided product is incorporated with a fat in such amount that the fat forms a continuous phase in which the gelatinized product is suspended.

When a suspension so made is maintained for a few hours or so at a temperature above either melting or softening of the fat present, there is minimized settling and practically no objectionable agglomeration of the suspended particles into larger flocs or masses such as would plug the nozzle of a spray gun if such masses were present in substantial proportion.

As the starch used there is selected crude or incompletely refined corn, potato, rice, or other starch associated with a substantial amount of naturally occurring water insoluble protein.

As the protein selected there is used a water insoluble protein that occurs in nature in intimate association with the particular starch chosen. Thus, corn protein is used with corn starch, potato protein with potato starch, and rice protein with rice starch. In using the combination of the two naturally occurring substances, there is assurance that there is introduced no objectionable incompatibility and established no flavor foreign to a natural product. Also, the use of the starch and protein occurring together in nature makes possible the convenient provision of a supply of the materials in intimate admixture with each other.

There may be used various proportions of protein but the protein should always be present in proportion that is minor as compared to the starch. Thus, there are used to advantage about 4 to 20 parts of protein and preferably about 5 to 10 parts for 100 parts of total weight of starch and protein.

The particular fat used will depend in part upon the use to which the suspension is to be put. For pan greases, for instance, it is required that the fat should be edible and generally satisfactory for greasing baking pans. The fat must be one that is liquid (this term including semiliquid) at temperatures that are not excessively high so that the partially gelatinized starch and protein mixture may be incorporated at a temperature above the melting or hardening point of the fat without the need of using such high temperatures as would develop decomposition products in the fat. Examples of suitable fats that may be used are hydrogenated cottonseed, soya bean, and corn oil, cocoanut, palm kernel, and sesame oils and animal fats such as those commonly used in pan greases and preferably having a melting point only slightly above atmospheric.

For best results the fat is used in proportion not substantially less than that of the gelatinized mixture of starch and protein. Suitable proportions are approximately 1 to 4 parts of the fat to 1 of the gelatinized starch and protein mixture. Very desirable results have been obtained commercially when the proportion of the fat is of the order of 1 to 2 parts for 1 of the said mixture.

While the invention is not limited to any particular theory of explanation of the desirable results obtained from the use of the gelatinized mixture in suspension in fats, it is considered that the change occurring during the gelatinization of the starch and water insoluble protein in contact with each other reduces the tendency to agglomeration of particles of the gelatinized mixture after the mixture has been dried, reduced to a powder and suspended in the fat, as compared to the tendency of the mixture to agglomerate before gelatinization or of starch alone either before or after gelatinization.

In a typical example of the practice of the invention, corn starch containing 5.5% of corn protein from which soluble protein has been substantially completely separated was made into a 15° to 25° Baumé slurry with water. The slurry was then heated to a maximum temperature of 146° F. for two minutes, to produce partial gelatinization of the mixture of starch and protein. The partially gelatinized material was subjected to filtration and the filter cakes were dried in a usual manner in a dryer at a temperature not substantially in excess of 175° F. The dried material was then pulverized in a mill, the product of the milling being predominantly of size to pass through a 150 mesh screen. The resulting gelatinized starch and protein mixture on analysis and test by standard methods gave the following results:

| | | |
|---|---|---|
| Moisture | per cent | 10 |
| Acidity (calc. as lactic) | do | 0.53 |
| Ash | do | 0.25 |
| Protein | do | 5.5 |
| pH | | 5.9 |
| Water solubility | | 0.92 |
| Water absorption | | 1.8 |

This product was then incorporated into two times its weight of hydrogenated cottonseed oil of melting range about 95° to 105° F.

In a modification of the invention, the starch and protein mixture of the kind described is gelatinized in the presence of a very small proportion of dilute volatile acid of kind such as hydrochloric and of concentration and at temperatures that are conventional in the acid gelatinization of starch. The partially gelatinized material is treated and used as described above.

What we claim is:

1. A composition of matter comprising a suspension in a fat of a dried and comminuted partially gelatinized mixture of starch and water insoluble protein in the proportion of about 4 to 20 parts of the protein to 100 parts of the said mixture, the fat constituting a continuous external phase, the starch and protein being of kinds occurring in nature in intimate association with each other, and the said mixture being gelatinized to the extent that it has a water absorption of less than 2.5 by the standard tests and when stirred with cold water causes bodying of the water.

2. A pan grease comprising a suspension of the kind described in claim 1, the fat being edible and the proportion of the said mixture being about 1 part to 1 to 4 parts of the fat.

3. The method of making a suspension of the kind described in claim 1 which comprises heating an aqueous mixture including starch and water insoluble protein occurring naturally with the starch to a temperature between about 135° F. and the pasting point of the starch, so that the starch is partially gelatinized but not pasted, forming the gelatinized mixture into dried and comminuted condition, and then mixing the dried and comminuted material with a fat, the fat being the continuous phase in the resulting suspension, the temperature of mixing being above the hardening point of the fat, and the proportion of the insoluble protein used being about 4 to 20 parts for 100 parts of starch and protein.

4. The method of making a suspension of the kind described in claim 1 which comprises partially gelatinizing a mixture of corn starch and water insoluble corn protein that is substantially free from water soluble protein, drying and pulverizing the resulting gelatinized product, and mixing the pulverized product with at least an equal proportion of a fat so as to form a suspension of the said product in the fat of minimized rate of settling of the suspended product, the proportion of protein being about 4 to 20 parts to 100 parts of the starch and protein and the gelatinizing being carried to the extent that the partially gelatinized mixture has a bodying effect when stirred into cold water and a water absorption by standard test not substantially above 2.5.

5. A pan grease admixture comprising a dried and comminuted partially gelatinized mixture of starch with water insoluble protein occurring naturally with the starch, the proportion of the protein being about 4 to 20 parts to 100 parts of the said mixture and the gelatinization of the mixture being of such extent as to cause the mixture to have a bodying effect when stirred into cold water and a water absorption by standard test that is not substantially above 2.5.

6. A pan grease admixture comprising a dried and comminuted partially gelatinized mixture of corn starch with corn gluten in the proportion of approximately 4 to 20 parts of the gluten to 100 parts of the starch and gluten, the starch in the mixture being in unpasted form but gelatinized to the extent that when stirred into cold water the mixture produces a bodying effect.

ROBERT L. LLOYD.
BEN F. BUCHANAN.